United States Patent
Lee et al.

(10) Patent No.: US 7,131,530 B2
(45) Date of Patent: Nov. 7, 2006

(54) INTERLOCKER FOR A CONVEYOR BELT AND METHOD OF UTILIZING AN INTERLOCKER FOR A CONVEYOR BELT

(75) Inventors: Rick Lee, Danville, KY (US); Stephen D. Duncan, Arlington, TX (US)

(73) Assignee: Transnorm System Inc., Grand Prairie, TX (US)

( * ) Notice: Subject to any disclaimer, the term of this patent is extended or adjusted under 35 U.S.C. 154(b) by 73 days.

(21) Appl. No.: 11/044,412

(22) Filed: Jan. 27, 2005

(65) Prior Publication Data

US 2006/0163040 A1 Jul. 27, 2006

(51) Int. Cl.
*B65G 21/16* (2006.01)

(52) U.S. Cl. ...................... 198/831; 198/834
(58) Field of Classification Search ............... 198/831, 198/832, 834, 847
See application file for complete search history.

(56) References Cited

U.S. PATENT DOCUMENTS

| | | | |
|---|---|---|---|
| 2,446,890 A * | 8/1948 | Stadelman | 198/831 |
| 2,619,222 A | 11/1952 | Przbylski | |
| 3,217,861 A | 11/1965 | Daniluk et al. | |
| 3,901,379 A | 8/1975 | Bruhm | |
| 4,202,443 A | 5/1980 | Buhrer | |
| 4,955,466 A | 9/1990 | Almes et al. | |
| 5,203,800 A | 4/1993 | Meredith | |
| 5,332,083 A | 7/1994 | Axmann | |
| 5,360,102 A * | 11/1994 | Schoning | 198/831 |
| 5,394,977 A | 3/1995 | Cline | |
| 5,860,512 A | 1/1999 | Gianvito et al. | |
| 5,992,615 A * | 11/1999 | Muchalov | 198/831 |
| 6,216,851 B1 | 4/2001 | Mitas et al. | |
| 6,564,931 B1 | 5/2003 | Edelmann | |
| 7,004,310 B1 * | 2/2006 | Axmann | 198/831 |
| 2004/0035685 A1 | 2/2004 | Fujiwara et al. | |

* cited by examiner

*Primary Examiner*—James R. Bidwell
(74) *Attorney, Agent, or Firm*—Kenneth F. Pearce

(57) ABSTRACT

The invention is related to drive units for conveyor belts. A flexible rider connected to the belt includes a gear for meshing with a gear of the rotable driver. The meshing of the gears allows the conveyor belt to be pulled about the conveyor.

20 Claims, 8 Drawing Sheets

INTERLOCKER FOR A CONVEYOR BELT AND METHOD OF UTILIZING AN INTERLOCKER FOR A CONVEYOR BELT

BACKGROUND OF THE INVENTION

1. Field of the Invention

Among other things, the present invention is related to drive units for conveyor belts. A flexible rider or interlocker is attached to the outward edge of the conveyor belt. The flexible rider includes a gear for meshing with a gear of the tapered rotable driver. Due to the meshing of the flexible rider and the rotable driver, the conveyor belt can be pulled about the conveyor frame.

2. Description of the Previous Art

1) U.S. Pat. No. 4,955,466—Almes, et. al., owned Applicant. Almes discloses reinforcing member 3 having a convex beading 4 positioned between rolling elements 9 and 10. Beading 4 includes symmetrical lips 5a and 5b. The '466 Patent does not teach or suggest a gear integrally formed on either lip 5a or lip 5b.

2) U.S. Pat. No. 5,360,102—Schoning is also owned by Applicant. FIGS. 1 and 2 disclose two bead marginal portions 9 with structures identical to the reinforcing members structures enabled in U.S. Pat. No. 4,955,466—Almes, et. al. Schoning does not teach or suggest a gear integrally formed with marginal portions 9.

3) U.S. Pat. No. 2,619,222—Przybylski enables a centering and take-up means for belt conveyors. The '222 Patent does not teach or suggest a belt interlocker having a lip or leg with a gear formed integrally thereon.

4) U.S. Pat. No. 3,217,861—Daniluk, et al. enables a curved conveyor belt. The '861 Patent does not teach or suggest a belt interlocker having a lip or leg with a gear formed integrally thereon.

5) U.S. Pat. No. 3,901,379—Bruhm enables an angular guidance for a conveyor belt system. Bruhm's elastic shoulder 10 is attached to belt 1 with rivet 16. Shoulder 10 rides against rollers 12 and 14. The '379 does not teach or suggest a lip or a leg attached to belt 1 that extends from shoulder 10 to pass though the opening between rollers 12 and 14 while shoulder 10 rides simultaneously against rollers 12 and 14.

6) U.S. Pat. No. 4,202,443—Buhrer describes a conveyor belt curve. The '443 Patent enables tension springs 8 to secure belt 1 to the conveyor. Buhrer does not teach or suggest a belt interlocker having a lip or a leg with a gear formed integrally thereon.

7) U.S. Pat. No. 5,394,977—Cline enables an apparatus and method for use in replacing conveyor belts. A U-shaped member 84 is secured to the outer edge portion 6 using suitable means, such as the adhesive or rivets, and provides shoulder portions 86 and 88 which are contacted by the cylindrical surfaces 48 and 64. The operation of the endless conveyor belt 4 produces a radially inwardly directed force but the cylindrical surfaces 48 and 64 bear against the shoulders 86 and 88 to keep the endless conveyor belt 4 moving in the desired path. Cline does not teach or suggest a belt interlocker having a lip or a leg with a gear formed integrally thereon where the lip passes through the opening between cylindrical surfaces 48 and 64.

8) U.S. Pat. No. 5,332,083—Axmann describes a curved belt conveyor. Rollers 40 and 41 press against the elevation 32 of belt 11. Axmann does not teach or suggest a belt interlocker having a lip or a leg with a gear formed integrally thereon.

9) U.S. Pat. No. 5,203,800—Meredith teaches a treadmill with a peripheral belt support. The Meredith profile is ideally built up from the edges of the endless belt 50, by attaching a multi-stranded cable core 40 made from stainless steel or other suitable material, with a fabric reinforcing strip 42. A tubular plastic sleeve 44 made from a strong and flexible plastic, such as nylon is then bonded over the prepared edge of the endless belt 50 using a vulcanizing process to form a continuous, seamless load-bearing profile to engage the support rollers 14. The '800 Patent does not teach or suggest a belt interlocker having a lip or a leg with a gear formed integrally thereon.

10) U.S. Pat. No. 5,860,512—Gianvito, et al. enables a sliding belt turn conveyor. Endless belt 12 is retained in the curved path by restraining devices 40, 41, and 42. Fasteners 55a secure wheel assemblies 46 to the edge of belt 12. Wheel 54 is mounted to a wheel support plate 47 and to the belt by fastener 55a. The wheel 54 has a plastic tire 54b mounted on a bushing 54a. Fastener 55a extends through belt 12, wheel support plate 47, and bushing 54a and is secured thereto by a nut 55b. Wheel assembly 46 extends generally perpendicular from a lower surface 12b of the endless belt so that tires 54b engage upper and lower vertical bearing surfaces 40a and 40b of bearing member 40 which restrains lateral movement of belt 12. The '512 Patent does not teach or suggest a belt interlocker having a lip or a leg with a gear formed integrally thereon.

11) U.S. Pat. No. 6,216,851—Mitas, et al. discloses a rivet belt fastener. The Mitas Patent does not teach or suggest a belt interlocker having a lip or a leg with a gear formed integrally thereon.

12) U.S. Pat. No. 6,564,931 B1—Edelmann enables a belt conveyor. Among other things, Edelmann requires a toothed ring 6 for each carrying roller 2. Carrying roller 2 has journal 8 that is connected to the drive device. The '931 toothed belt 7 is fixed on conveying belt 1, and importantly, is a constituent part of a toothed belt component 9. Counterpressure 10 presses toothed belt component 9 onto the conveying belt 1. The free ends of the essentially U-shaped toothed belt component 9 are configured as a bead 11, which produces a bead ridge along the conveying belt border. Bead 11 rides against guide rollers 12. Guide rollers 12 are fastened on angled retaining arms 13 such that they act on the toothed-belt component 9 and/or on the bead 11 by way of inclined running surfaces. Edelmann does not teach or suggest a belt interlocker having a lip or a leg with a gear formed integrally thereon where the lip passes through the opening between guide rollers 12.

13) US Patent Application 2004/0035685—Fujiwara, et al. discloses a curved belt support apparatus. A thick part 220 is formed across the entire outer edge area of the Fujiwara curved belt 200. The thick part 220 is thicker than the rest of the curved belt 200 on both the top and bottom surfaces. Upper inner side surface 221 of the thick part 220 is oriented diagonally upward facing the radial inner edge of the curved belt 200, while the lower inner side surface 222 is oriented diagonally downward facing the radial inner edge of the curved belt 200. The curved conveyor 100 has support apparatuses 300 that support the thick part 220 and prevent it from moving in the direction of the radial inner edge of the curved belt 200.

SUMMARY OF THE INVENTION

Unlike traditional conveyors, the present invention includes a flexible interlocker or rider attached to the conveyor belt. An integrally formed rider has two legs or lips that extend from the head of the rider to create a slot for receiving a portion of the conveyor belt. The belt is pushed into the slot until the belt encounters the stop formed in the head or the transitional body. In accordance with present invention, the interlocker's head or transitional body are distal from the outward edge of the conveyor belt.

A portion of the belt is sandwiched between the rider's legs and the legs and the belt are attached to each other using stitches or any other manner acceptable in the art. In select embodiments the interlocker is formed in the general configuration of a clip. As the conveyor belt circulates about the conveyor, holders mounted to the conveyor frame grip the rider's head while allowing the rider's lips to pass through an opening between the holders' rotable bearings. At least one lip includes a gear integrally formed thereon for meshing with a corresponding gear of the driver or pulley. Due to the meshing of the pulley gear and the lip gear, the conveyor belt can be driven in either direction.

An aspect of the present invention is to provide a bi-directional conveyor, having a unique drive unit, where the drive unit includes a rider.

Still another aspect of the present invention is to provide a curved conveyor.

It is another aspect of the present invention to enable a method of gripping tautly the outer arc of the curved conveyor belt and moving the conveyor belt.

Yet another aspect of the present invention is to provide a holder for gripping the head of the rider as the rider circulates with the moving conveyor belt.

Still another aspect of the present invention is to provide a rider that has a head integrally formed with a pair of lips or legs for gripping a portion of the belt.

Yet still another aspect of the present invention is to provide a drive unit that includes a drive pulley including a gear for meshing with a gear that is integrally formed on at least one side of one of the interlocker's legs or lips.

It is still another aspect of the present invention to provide a flexible rider that has lips extending through the gap of the holder and toward the inward side of the belt to better protect the outward arc portion of the conveyor belt.

Still another aspect of the present invention is to provide a rider that in unyielding with respect to its movement toward the inward arc of the conveyor while simultaneously being bendable with respect to upward and downward motions of outward edge of the conveyor belt as the conveyor belt circulates about the curved conveyor.

Yet still another aspect of the present invention is to provide a flexible interlocker formed in the general shape of a clip.

It is yet another aspect of the present invention to provide a lip that has a plurality of substantially parallel ridges formed thereon.

Still another aspect of the present invention is to provide a rider that has a generally ellipsoidal shaped head.

Yet still another aspect of the present invention is to provide an interlocker that has a convex head.

It is yet another aspect of the present invention to provide a rider that has a transitional body positioned between the head and the legs.

Still another aspect of the present invention is to provide an interlocker where the rider's transitional body rather than the rider's head rides against the holder's rotable bearings.

An embodiment of the present invention can be described as a conveyor carrying a belt having an inward arc and an outward arc, comprising: a frame including an inward side and an outward side; a roller attached between said inward side and said outward side for supporting the curved belt; a drive unit comprising: a drive shaft; a pulley connected to said inward side and said outward side of the frame comprising: a recess proximate the outward side of the frame, and a first set of teeth positioned in the recess, an endless loop rider integrally formed with a convex head, an outward lip and an inward lip, wherein: the outward lip and the inward lip are sized to fit through an opening and the endless loop convex head is prohibited from passing through the opening, the inward lip's surface proximate said first set of teeth comprises a second set of teeth for meshing with the first set of teeth, and means for connecting the endless loop rider to the conveyor belt; a plurality of holders mounted to said frame for gripping the endless loop rider, and a power source for the drive unit.

Another embodiment of the present apparatus can be described as a conveyor comprising: a curved frame including an inward arc and an outward arc; at least one roller; a rotable driver connected to the inward arc and the outward arc including a first set of teeth positioned proximate to the outward arc; an endless loop rider integrally formed with a head, an outward lip and a inward lip and including a second set of teeth for meshing with the first set of teeth; means for connecting the endless loop rider to the conveyor belt; and a plurality of holders mounted to outward arc for gripping the said endless loop rider.

Yet another embodiment of the present device can be described as an endless loop interlocker extending outward from an outward arc of a curved conveyor belt comprising: a rider surrounding a margin of the conveyor belt and integrally formed with a first lip and a second lip; a plurality of substantially parallel ridges raised on a side of at least one of the lips; and means for connecting the endless loop interlocker to the outward arc.

In still another embodiment, the present invention can be described as an endless loop integrally formed flexible clip for riding in a holder, comprising: a generally ellipsoidal shaped head; a tapered transitional body, extending between said generally ellipsoidal shaped head and a first leg and a second leg; and the first leg spaced apart from the second leg, wherein the first leg further comprises a plurality of teeth.

In still another embodiment, the present invention can be described as a method of gripping tautly the outer arc of a curved conveyor belt, comprising the steps of: attaching a holder to a frame of a curved conveyor including an upper and lower rotable bearing; clipping the curved conveyor belt between a first leg, a second leg and a head of a flexible clip; forming a set of teeth in at least one of the first leg or the second leg; connecting the curved conveyor belt to the flexible clip; maintaining the head of said flexible clip on outward sides of the upper rotable bearing and the lower rotable bearing; and adjusting the upper rotable bearing and the lower rotable bearing against the head of the flexible clip such that the holder grips tautly the curved conveyor belt.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 4A is a perspective of a ring of teeth than can fit over the driver's recess.

FIG. 4B is a side view of the ring of teeth depicted in FIG. 4A.

DESCRIPTION OF THE PREFERRED EMBODIMENTS

Although the disclosure hereof is detailed to enable those skilled in the art to practice the invention, the embodiments published herein merely exemplify the present invention.

Although the present invention can be practiced with straight conveyors, the preferred embodiments are preferably incorporated into conveyor curves. In the most general sense, a frame and its cross members support the curved conveyor belt, pulley, roller and belt holders. Both the frame and the conveyor have inward and outward arcs, with the respective inward arcs being of a lesser length than their corresponding outward arcs.

In most preferred embodiments, at least one roller is position between the outward and inward arc of the frame. The drive unit includes a pulley that is also positioned between the outward and inward arc of the frame. In select embodiments, the pulley will include a recess—the recess being positioned proximate the outward arc of the frame and opposite the inward arc of the frame. A unique feature of the current invention is that a set of teeth can be formed in the pulley's recess or a ring of teeth can be inserted over the pulley's recess. In other select embodiments, the conveyor can also include a second drive unit positioned between the outward and inward arc of the frame.

Belt holders mounted to the frame are located strategically about the outward arc of the conveyor frame to, in part, counteract the radial pulling associated with curved conveyor belts. Among other things, the belt holders include an upper rotable bearing and a lower rotable bearing. There is a passage between the upper rotable bearing and the lower rotable bearing that allows a portion of the conveyor belt and a portion of the conveyor belt's interlocker to ride between the rotable bearings.

The flexible interlocker or rider has a convex or a generally ellipsoidal head that rides against the rotable bearings, and cannot be pulled through the opening between the upper and lower rotable bearings toward the frame's inward arc. The rider also includes at least one lip or leg surface that has a set of teeth for meshing with the pulley's teeth. Select embodiments of the rider have a transitional body positioned between the belt interlocker's convex head and the rider's legs. In other words, the legs or lips can pass through the passage between the holder's upper and lower bearings while the convex head and transitional body are prevented from being pulled through the passage between the bearings.

Adjusting the holders and the pulley allows the curved conveyor belt to be gripped tautly. Due to the meshing of two sets of teeth, the tautly gripped belt can be driven in either a forward a rearward direction. In select embodiments, a rotable bearing engages the lip having the teeth integrally formed thereon to ensure adequate meshing between the lip's teeth an the pulley's teeth.

Figure 1:
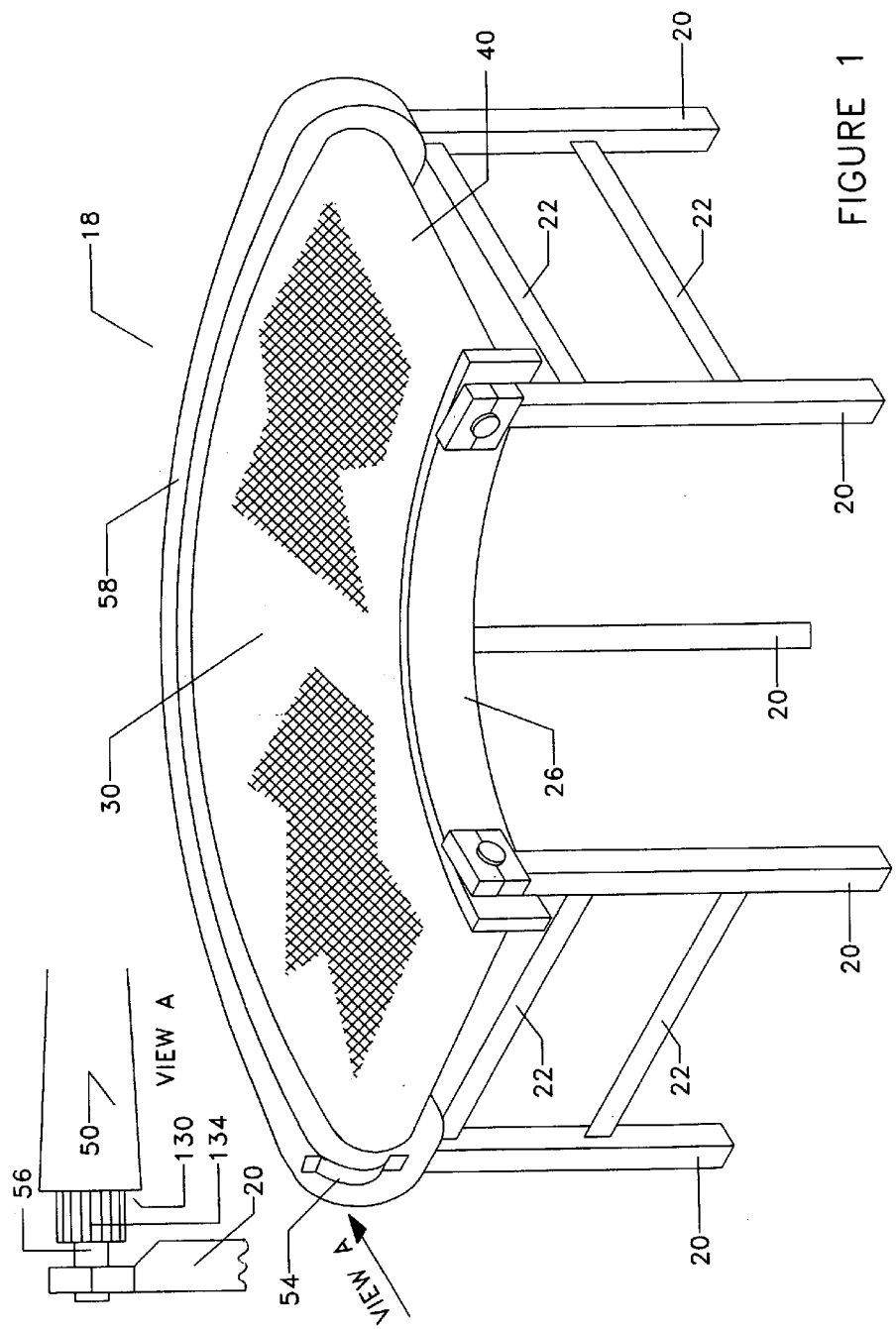
FIG. 1 is a simplistic three-dimensional representation of a conveyor within the scope of the present invention.
Figure 2:
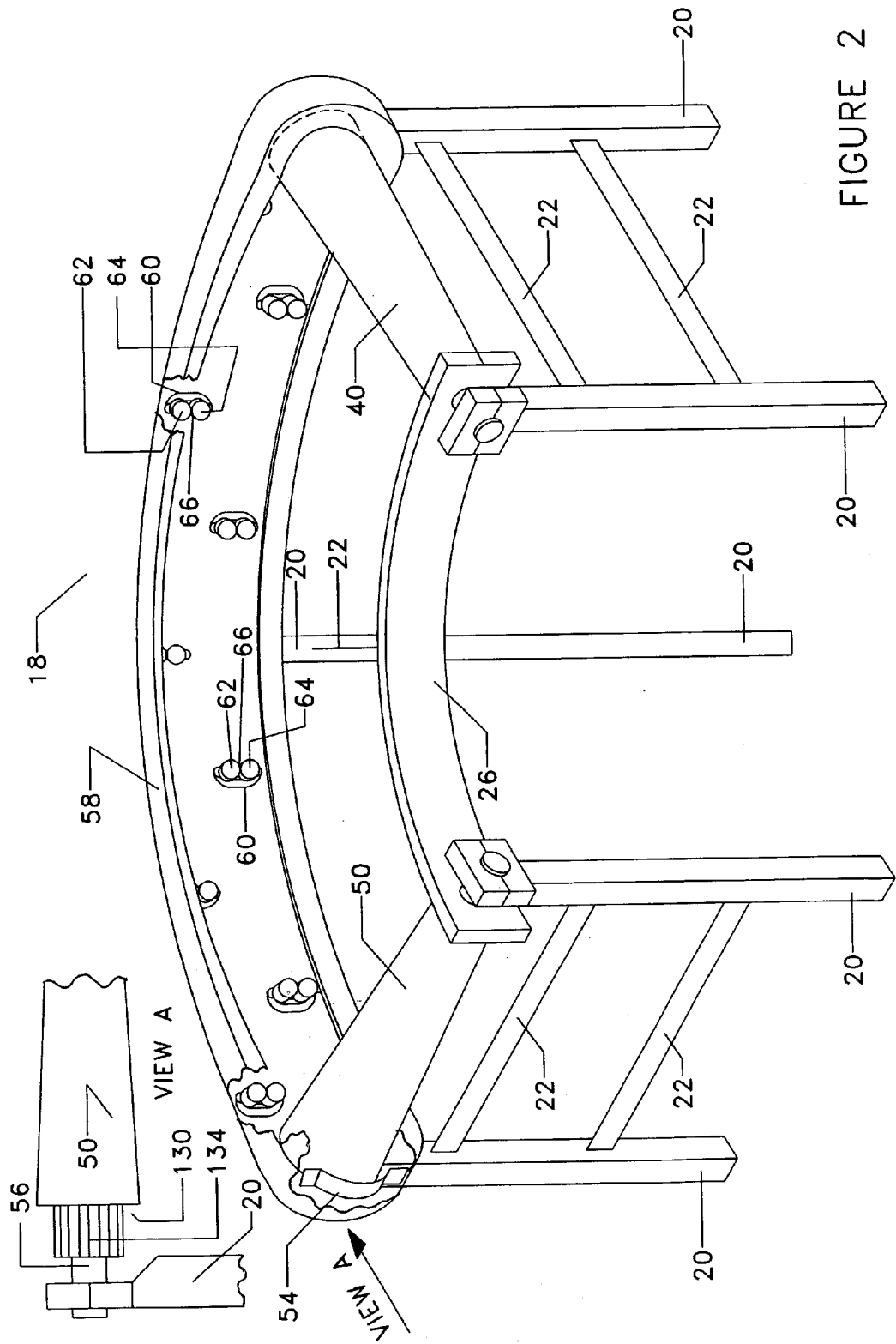
FIG. 2 is the identical view of FIG. 1 with the conveyor belt cut away, including a single drive unit.
Figure 2A:
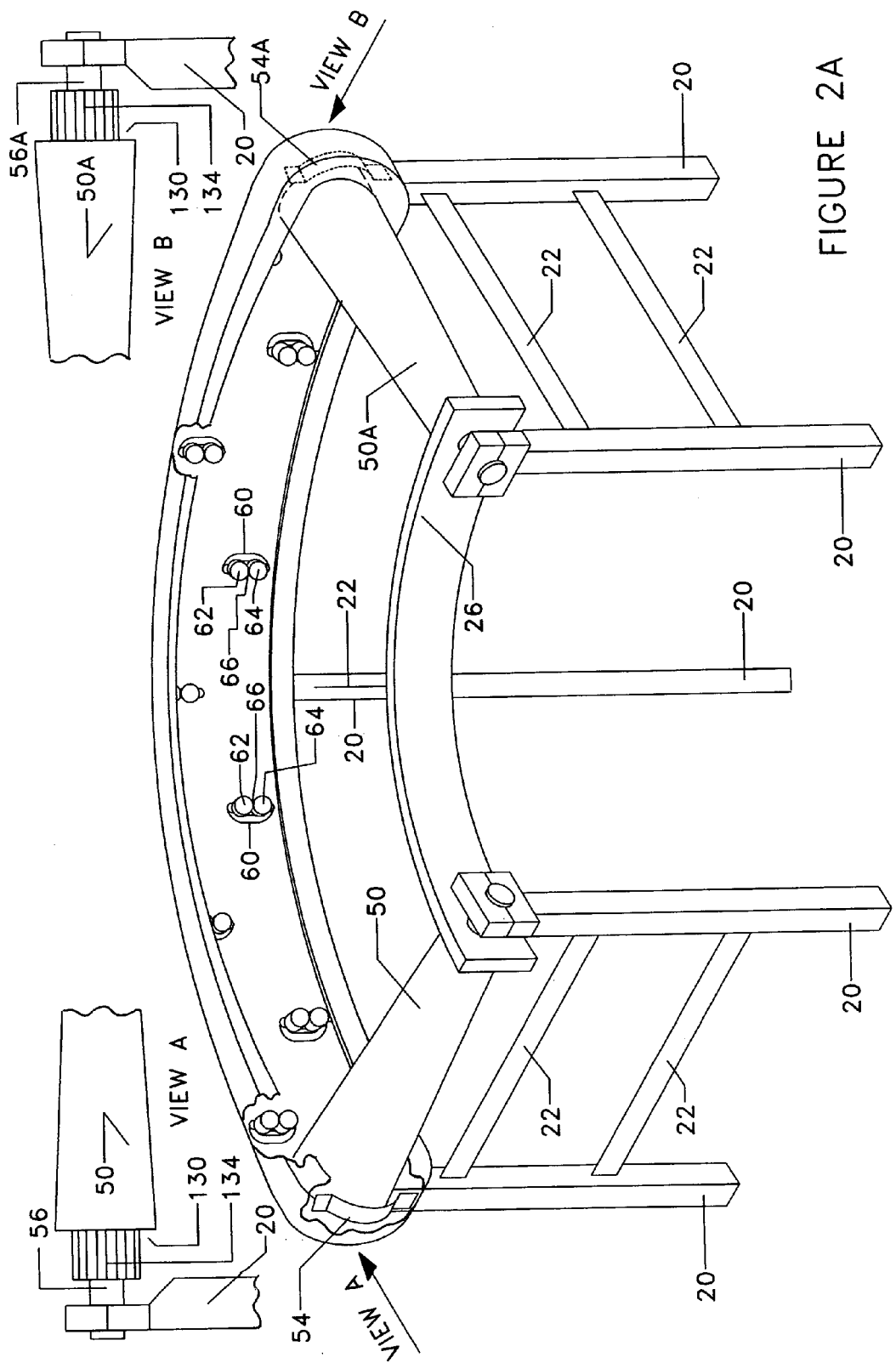
FIG. 2A is also a view of FIG. 1 with the conveyor belt cut away that includes a second drive unit.

Turning now to FIGS. 1, 2 and 2A, a preferred embodiment of a curved conveyor (18) within the scope of the present invention is disclosed. FIG. 1 shows conveyor (18) including conveyor belt (30). In FIGS. 2 and 2A, conveyor belt (30) has been cutaway from conveyor (18). FIG. 2 depicts a conveyor incorporating pulley (50) and roller 40 while FIG. 2A discloses a conveyor utilizing first pulley (50) and second pulley (50A).

As shown in FIGS. 1–2A, curved conveyor (18) has a frame including a plurality of legs (20), cross members (22) and arc members (26). Inward arc of conveyor (18) is of lesser length than outward arc of conveyor (18). Conveyor belt (30) circulates in an endless loop about roller (40) and pulley (50) or pulley (50) and pulley (50A). Drivers (50) and (50A) are tapered from their outward margins toward their inward margins, with the greater circumferences located along their outward borders proximate the outward arc of conveyor (18).

As shown in View A, along with being joined to hollow shaft (56), pulley (50) circumscribes the majority of hollow shaft (56). Similarly, in View B, pulley (50A) circumscribes hollow shaft (56A) and is joined to hollow shaft (56A). Hollow shaft (56) can be coupled to a drive shaft (not shown) and a source of power for driving pulley (50) while hollow shaft (56A) can be coupled to a second drive shaft (not shown). Conveyor (18) can also provided with finger guards (54) and (54A) and holder cover (58).

As best shown in FIGS. 2 and 2A, holders (60) are mounted to outer arc member (26) of conveyor (18). Holders (60) are mounted to hold both the load carrying side of belt (30) and the non-carrying side of endless loop belt (30). Each holder (60) includes upper rotable bearing (62) and lower rotable bearing (64). Upper rotable bearing (62) and lower rotable bearing (64) are positioned to create a belt passage (66) between upper rotable bearing (62) and lower rotable bearing (64).

Figure 3:
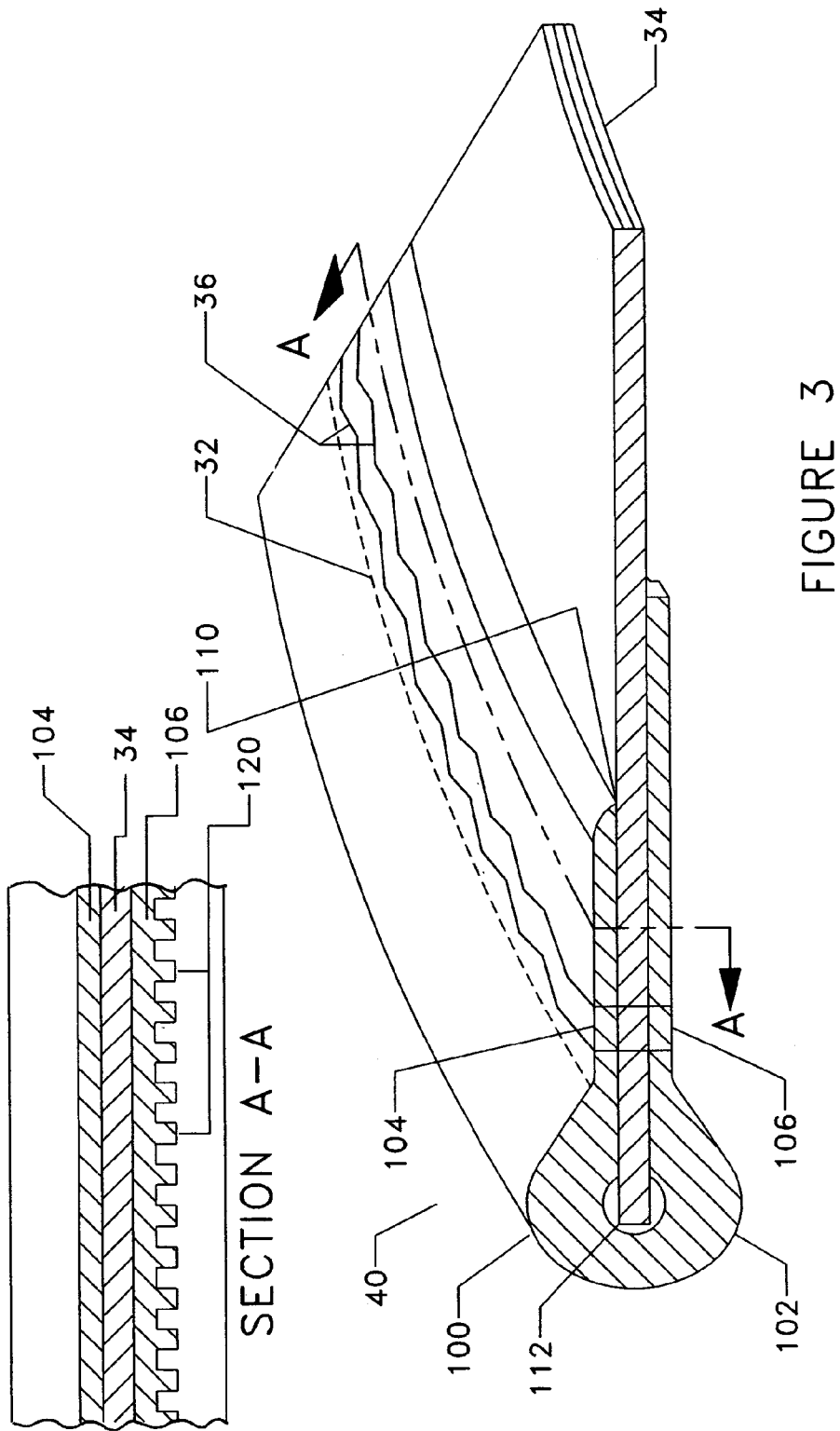
FIG. 3 is a cross-sectional view of the conveyor belt and the interlocker, within the scope of the present invention.

FIG. 3 is a cross-section of conveyor belt (30) showing flexible rider or interlocker (100) receiving a portion of belt (30). Conveyor belt (30) has outward arc (32) and inward arc (34). Interlocker (100) is connected to belt (30) with threads or stitches (36). However, other means for connecting interlocker (100) and belt (30) can include rivets, internal grippers molded into the flexible rider, adhesives or any combination thereof.

In one embodiment of the current invention, flexible rider (100) can be described as an integrally formed clip. Extending from generally ellipsoidal shaped or convex head (102) is lip or leg (104) and lip or leg (106). In select embodiments, clip (100) can be provided with transitional body (108) (shown in FIG. 4) formed between head (102) and legs (104) and (106). Lips (104) and (106) are dimensioned to ride through passage (66) between upper rotable bearing (62) and lower rotable bearing (64) while head (102) is of large enough dimension to be prevented from riding through passage (66). Generally ellipsoidal shaped head rides against upper rotable bearing (62) and lower rotable bearing (64). Leg (104) contacts the outward side of belt (30) and leg (106) engages inward side of belt (30). A portion of belt (30)

is sandwiched between lips (104) and (106). As previously indicated, stitches, rivets, internal grippers molded into the flexible rider, adhesives or any combination thereof can attach legs (104) and (106) to belt (30).

Rider or clip (100) includes slot (110) for receiving conveyor belt (30). Before belt (30) can abut end or stop (112) of slot (30), belt (30) is first threaded between lips (104) and (106). Depending upon the preferred embodiment practiced, stop (112) can be located in either convex head (102) or transitional body (108). Thus, end (112) and generally ellipsoidal shaped head (102) are positioned distal from the outward arc (32) of curved conveyor belt (30). As shown, lip (106) is of greater length than lip (104). However, lip (104) and (106) can be of identical or similar lengths. Importantly, as shown in Section A—A of FIG. 3, lip (106) has a set of teeth (120) incorporated thereon and integral therewith.

Figure 4:
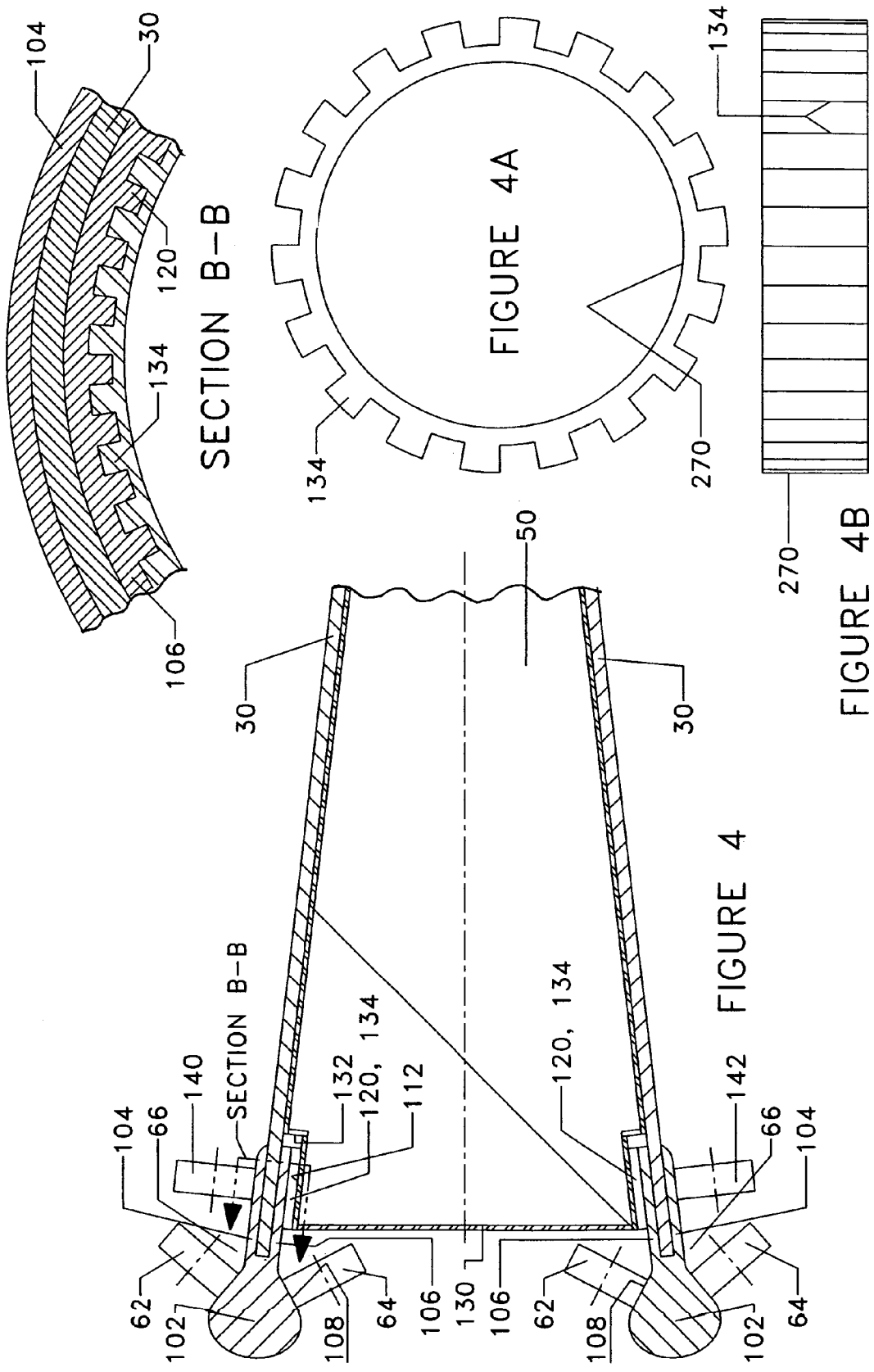
FIG. 4 is a close-up view of a portion of a drive pulley, within the scope of the present invention.

With reference to FIG. 4, conveyor belt (30) is driven about tapered driver (50). Tapered pulley (50) has recess (130) positioned near outward side (132) of driver (50). As shown with particularity in Section B—B of FIG. 4, a set of teeth (134) are formed in recess (130) for meshing with teeth (120) of lip (106). However, those skilled in the art recognize that in another embodiment, when driver (50) is not manufactured with teeth (134) in recess (130), a ring of teeth (270), such as that shown in FIGS. 4A and 4B, can be fitted over recess (130) to mesh with teeth (120) of lip (106).

Rotable bearings (140) and (142) ensure teeth (120) of lip (106) mesh with teeth (134). In select embodiments, both teeth (120) and a part of inner side (112) of lip (106) ride in recess (130) of driver (50). Upper rotable bearing (62) and lower rotable bearing (64) of holder (60) engage transitional body (108) of interlocker (100). Transitional body (108) is gripped tautly by rotable bearings (62) and (64) of holder (60), but belt (30) sandwiched between lips (104) and (106) can ride freely through passage (66). Due to the meshing of teeth (120) and teeth (134), when rotable driver (50) rotates, belt (30) is pulled about conveyor and belt (30) and lips (104) and (106) ride through passage (66) of holder (60), while transitional body (108) rides against rotable bearings (62) and (64).

Figure 5:
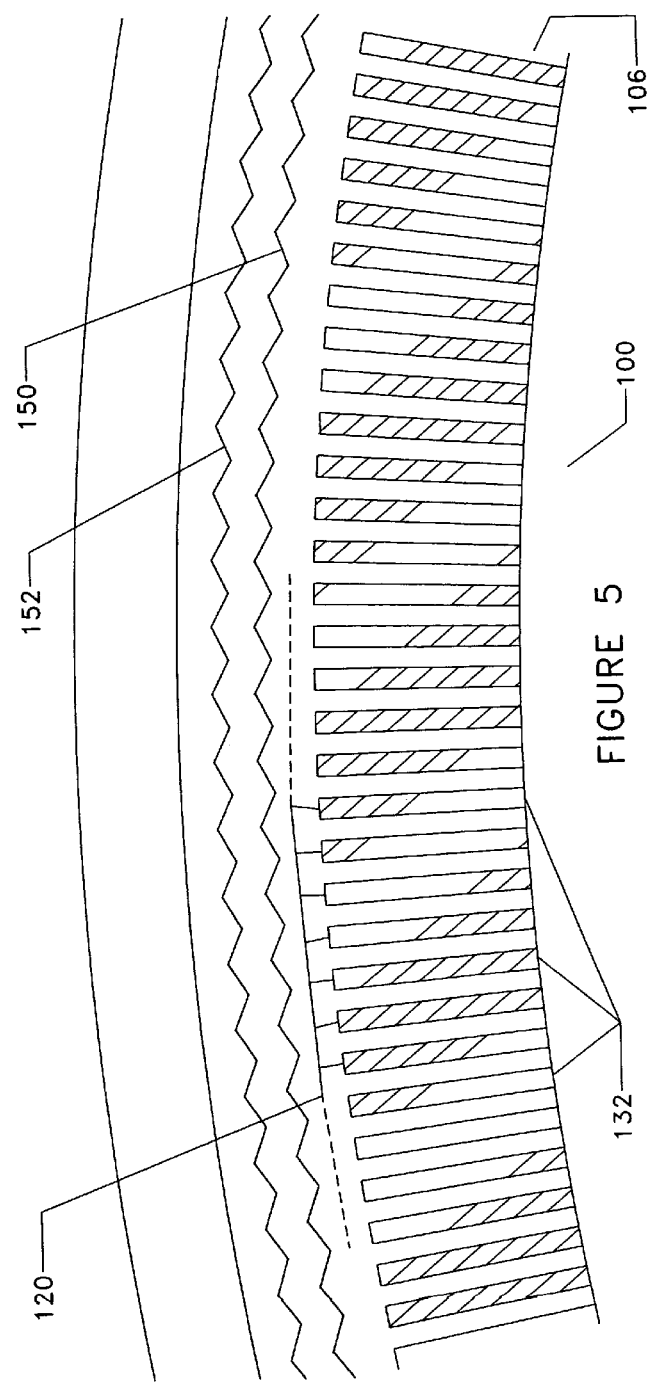
FIG. 5 is a view looking outward from the teeth of driver toward the inward side of lip of the interlocker.

FIG. 5 is a view looking outward from teeth (134) of driver (50) toward the inward side of lip (106) of interlocker (100). Rider (100) has a plurality of substantially parallel ridges or teeth (120) for meshing with the pulley's teeth (134). Of course, those skilled in the art recognize that depending upon the teeth (134) associated with driver (50), the rider's teeth (120) other than substantially parallel ridges can be integrally formed on the inward side of leg (106). As shown, two rows of stitching (150) and (152) attach lip (106) to the conveyor belt (not shown). And as previously indicated, lip (106) is integrally formed with generally ellipsoidal shaped head (102) of rider (100).

Figure 6:
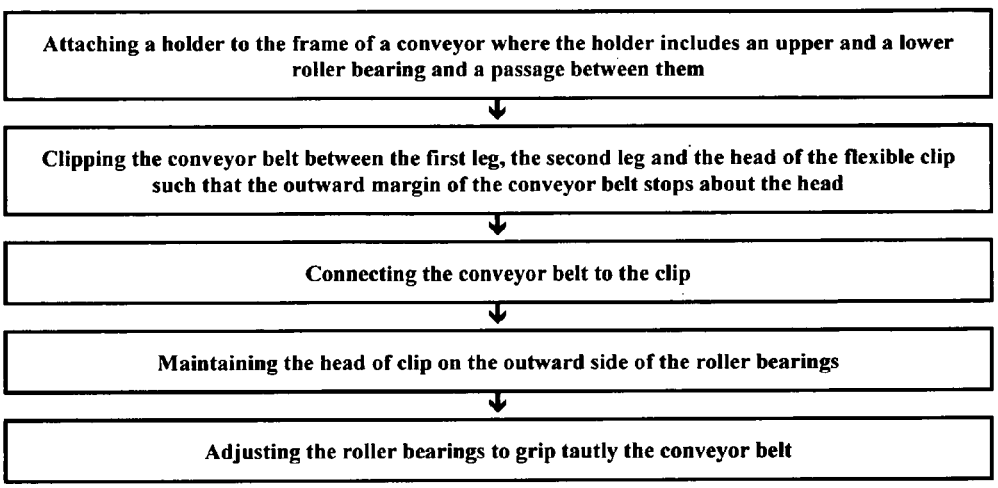
FIG. 6 is a depiction of the steps of an embodiment of the present invention.
Figure 7:
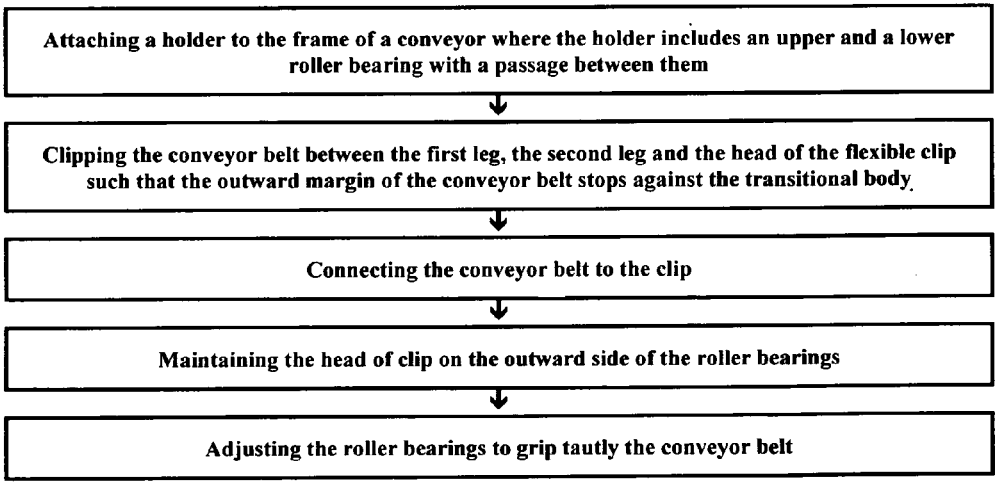
FIG. 7 is an exemplification of the steps of yet another embodiment of the current method.
Figure 8:
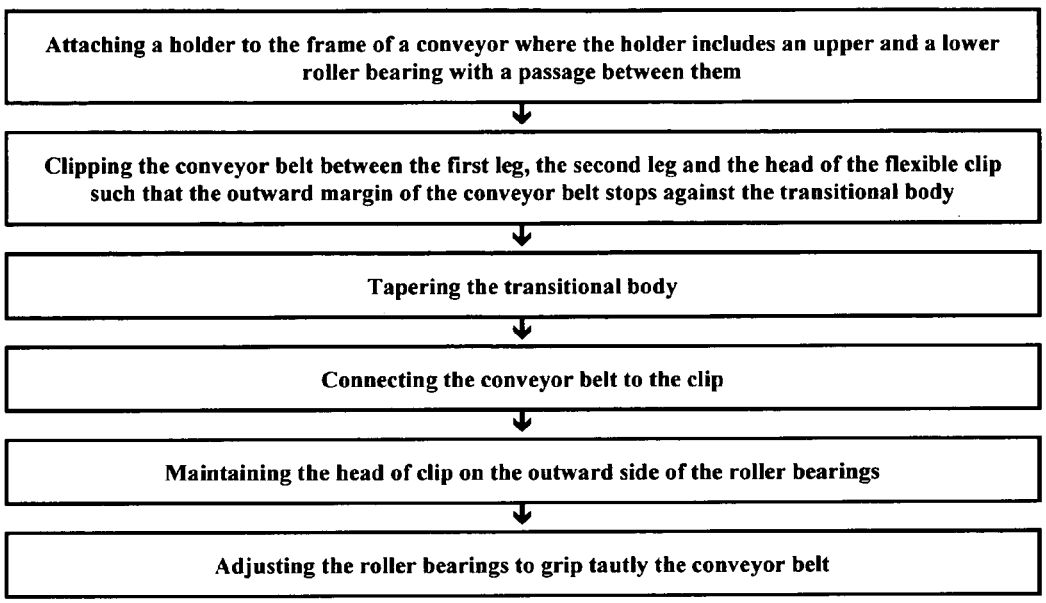
FIG. 8 is a diagrammatic representation of the steps of still another embodiment of the present invention.
Figure 9:
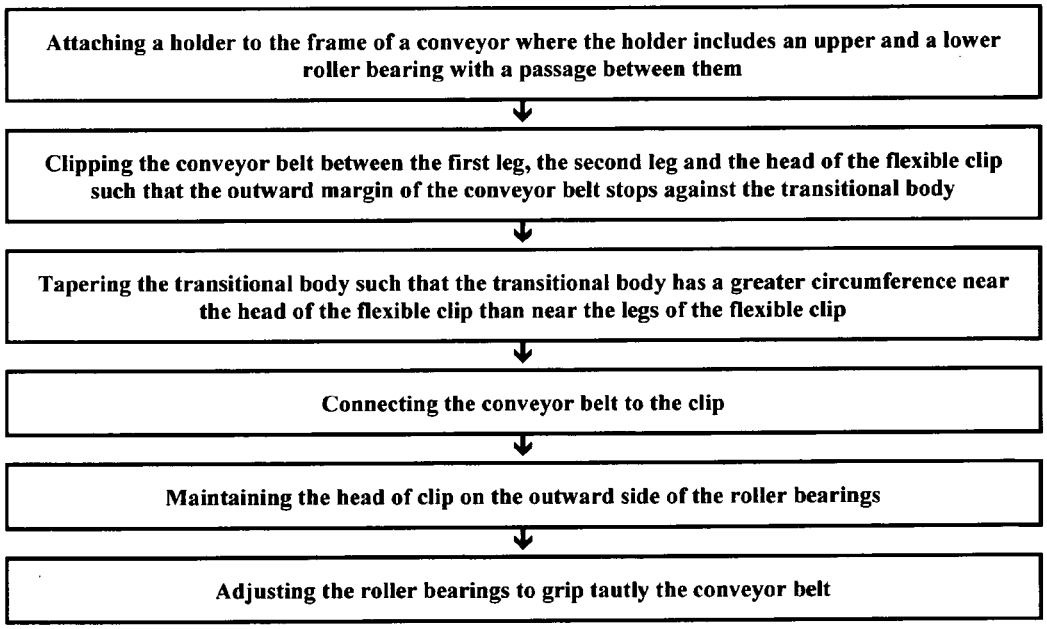
FIG. 9 is another diagrammatic representation of the steps of still another embodiment of the present invention.

Steps associated with the practice of the present invention and method are set forth in FIGS. 6–8. Those steps are related to the practice of using the interlocker's and conveyor's belt structures previously set forth.

Having disclosed the invention as required by Title 35 of the United States Code, Applicant now prays respectfully that Letters Patent be granted for his invention in accordance with the scope of the claims appended hereto.

What is claimed is:

1. A conveyor carrying a curved belt having an inward arc and an outward arc, comprising:
  a) a frame including an inward side and an outward side;
  b) a roller attached between said inward side and said outward side for supporting said curved belt;
  c) a drive unit comprising:
    i) a drive shaft;
    ii) a pulley connected to said inward side and said outward side of said frame and said drive shaft comprising:
      A) a recess proximate said outward side of said frame; and
      B) a first set of teeth positioned in said recess;
    iii) an endless loop rider integrally formed with a convex head, an outward lip and an inward lip, wherein:
      A) said outward lip and said inward lip are sized to fit through an opening and said endless loop convex head is prohibited from passing through said opening;
      B) said outward lip is of lesser length than said inward lip;
      C) said endless loop convex head, said upper up and said lower lip create a slot for receiving an outward portion of said conveyor belt such that said endless loop convex head is positioned distal from said conveyor belt, said upper lip and said lower lip;
      D) said inward lip's surface proximate said first set of teeth comprises a second set of teeth for meshing with said first set of teeth; and
      E) said inward lip's inward surface circulates about said recess; and
    iv) means for connecting said endless loop rider to said conveyor belt;
  d) a plurality of holders mounted to said frame for gripping said endless loop rider, wherein each holder of said plurality of holders comprises said opening created between an upper rotable bearing and a lower rotable bearing; and
  e) a power source for said drive unit.

2. The invention of claim 1, wherein said endless loop rider further comprises a transitional body.

3. The invention of claim 2 further comprising a bearing for ensuring meshing of said first and said second sets of teeth.

4. The invention of claim 3 wherein said first set of teeth is a ring of teeth.

5. The invention of claim 4 further comprising a second drive unit.

6. A conveyor comprising:
  a) a curved frame including an inward arc and an outward arc;
  b) at least one roller attached between said inward arc and said outward arc for supporting said curved belt;
  c) a rotable driver connected to said inward arc and said outward arc including a first set of teeth positioned proximate to said outward arc;
  d) an endless loop rider integrally formed with a head, an outward lip and a inward lip and including a second set of teeth for meshing with said first set of teeth, wherein:
    i) said outward lip and said inward lip are sized to fit through an opening and said head is prohibited from passing through said opening; and
    ii) said head, said outward lip and said inward lip create a slot for receiving an outward portion of said conveyor belt such that said head is positioned distal from said conveyor belt, said outward lip and said inward lip;
  e) means for connecting said endless loop rider to said conveyor belt; and f) a plurality of holders mounted to said outward arc for gripping said endless loop rider, wherein each holder of said plurality of holders comprises said opening; said opening being created between an upper rotable bearing and a lower rotable bearing.

7. The invention of claim 6, wherein said head is convex.

8. The invention of claim 7, wherein said endless loop rider further comprises a transitional body.

9. The invention of claim 8 further comprising a bearing for ensuring meshing of said first and said second sets of teeth.

10. A drive unit for a belt conveyor comprising:
   a) a driver including a set of teeth located proximate at least one end thereof;
   b) a belt interlocker comprising:
      i) a flexible rider integrally formed with a head, a first lip and a second lip, wherein said flexible rider, said first lip and said second lip create a slot for first receiving a portion of said conveyor belt such that when said portion is fitted into said slot said portion contacts said first lip and said second lip prior to contacting said head;
      ii) said head surrounding a margin of said conveyor belt;
      iii) said lip proximate said driver further comprising teeth for meshing with said driver's teeth; and
      iv) means for connecting said interlocker to said conveyor belt; and
   c) a holder for guiding said interlocker, wherein said holder further comprises:
      i) an upper rotable bearing contacting said interlocker; and
      ii) a lower rotable bearing contacting said interlocker.

11. An endless loop interlocker extending outward from an outward arc of a curved conveyor belt comprising:
   a) a rider surrounding a margin of said conveyor belt and integrally formed with a first lip and a second lip, wherein said rider, said first lip and said second lip create a slot for receiving a portion of said conveyor belt;
   b) a plurality of first teeth on a side of at least one of said lips; said plurality of first teeth formed to mesh with a second plurality of second teeth located about a driver; and
   c) means for connecting said endless loop interlocker to said outward arc.

12. The invention of claim 11, wherein said rider further comprises a rider including a generally ellipsoidal shaped head.

13. The invention of claim 12, wherein said rider further comprises a transitional body.

14. The invention of claim 13 wherein said transitional body is tapered.

15. An endless loop integrally formed flexible clip extending outward from an outward arc of a curved conveyor belt for riding in a holder, comprising:
   a) a generally ellipsoidal shaped head;
   b) a tapered transitional body, extending between said generally ellipsoidal shaped head and a first leg and a second leg, for fitting against an outward border of said conveyor belt; and
   c) said first leg spaced apart from said second leg, wherein said first leg further comprises a plurality of teeth raised on at least one side thereof.

16. The invention of claim 15 wherein said transitional body comprises a greater circumference proximate said generally ellipsoidal shaped head than proximate said outward border of said conveyor belt.

17. A method of gripping tautly the outer arc of a curved conveyor belt, comprising the steps of:
   a) attaching a holder to a frame of a curved conveyor, wherein said holder includes:
      i) at least one upper rotable bearing;
      ii) at least one lower rotable bearing; and
      iii) a passage between said upper rotable bearing and said lower rotable bearing;
   b) clipping said curved conveyor belt between a first leg, a second leg and a head of a flexible clip such that an outward margin of said curved conveyor belt stops about said head of said flexible clip, and wherein at least one of said first leg or said second leg includes a set of teeth;
   c) connecting said curved conveyor belt to said flexible clip;
   d) threading said first leg, said curved conveyor belt and said second leg through said passage between said upper rotable bearing and said lower rotable bearing;
   e) maintaining said head of said flexible clip on outward sides of said upper rotable bearing and said lower rotable bearings; and
   g) adjusting said upper rotable bearing and said lower rotable bearing about said head of said flexible clip such that said holder grips tautly said curved conveyor belt.

18. The invention of claim 17 further comprising the step of positioning a transitional body between and integral with said head and said first and said second leg such that said belt stops against said transitional body rather than said head.

19. The invention of claim 18 further comprising the step of tapering said transitional body.

20. The invention of claim 18 further comprising the step of making said transitional body with a lesser circumference proximate said first leg and said second leg and a greater circumference proximate said head.

* * * * *